(12) United States Patent
Mills (10) Patent No.: US 11,112,215 B2
(45) Date of Patent: Sep. 7, 2021

(54) HOLOGRAPHIC GUNSIGHT WITH LOW PROFILE COLLIMATOR

(71) Applicant: Ziel Optics, Inc., Ann Arbor, MI (US)

(72) Inventor: Kurt Douglas Mills, Stockbridge, MI (US)

(73) Assignee: Optiflow, LLC, Ann Arbor, MI (US)

( * ) Notice: Subject to any disclaimer, the term of this patent is extended or adjusted under 35 U.S.C. 154(b) by 316 days.

(21) Appl. No.: 16/437,017

(22) Filed: Jun. 11, 2019

(65) Prior Publication Data

US 2019/0383578 A1 Dec. 19, 2019

Related U.S. Application Data

(60) Provisional application No. 62/686,384, filed on Jun. 18, 2018.

(51) Int. Cl.
| | |
|---|---|
| *F41G 1/30* | (2006.01) |
| *G02B 5/32* | (2006.01) |
| *G02B 17/08* | (2006.01) |
| *F41G 1/34* | (2006.01) |

(52) U.S. Cl.
CPC ............... *F41G 1/30* (2013.01); *G02B 5/32* (2013.01); *G02B 17/0808* (2013.01); *F41G 1/345* (2013.01)

(58) Field of Classification Search
CPC .. F41G 1/30; F41G 1/345; G02B 5/32; G02B 17/0808

USPC .......................................................... 359/15
See application file for complete search history.

(56) References Cited

U.S. PATENT DOCUMENTS

| | | |
|---|---|---|
| 5,483,362 A | 1/1996 | Tai et al. |
| 7,145,703 B2 | 12/2006 | Sieczka et al. |
| 8,578,646 B2 * | 11/2013 | Joannes ............... F41G 1/30 42/113 |

FOREIGN PATENT DOCUMENTS

| | | |
|---|---|---|
| CN | 207051189 U | 2/2018 |
| WO | WO-2018022331 A1 | 2/2018 |

* cited by examiner

*Primary Examiner* — Collin X Beatty
(74) *Attorney, Agent, or Firm* — Dinsmore & Shohl LLP; Douglas L. Wathen (57) ABSTRACT

A holographic weapon sight with a low profile collimator has a housing with a viewing end and an opposed target end. The holographic weapon sight has a light source operable to project a light beam along a light path. The low profile collimator has a first optical element and a second optical element disposed in the light path of the light beam such that the second optical element provides a fully collimated light beam. The holographic weapon sight also has a first diffractive optical element (DOE), a second DOE, and a mirror. The first DOE or the second DOE reconstructs an image of a reticle and respectively reflects the reconstructed image toward the mirror or the NDE such that a user views a target along a viewing path through the NDE from the viewing end.

13 Claims, 5 Drawing Sheets

HOLOGRAPHIC GUNSIGHT WITH LOW PROFILE COLLIMATOR

REFERENCE TO RELATED APPLICATION

This application claims priority from U.S. Provisional Patent Application Ser. No. 62/686,384, filed Jun. 18, 2018, the entire content of which is incorporated herein by reference.

FIELD OF INVENTION

The present invention relates generally to sighting devices that generate a reticle or other image for aiming weapons or optical devices.

BACKGROUND OF THE INVENTION

There are several types of sights available in the market to enable a user of a weapon such as a rifle, shotgun, handgun, or submachine gun to aim these weapons. Examples of such sighting devices include laser sights, holographic sights, and "reflex" or "red dot" sights. Existing sights are made up of numerous optical components resulting in their large size, weight, energy consumption, and effort required for assembly. It would be desirable to overcome the limitations of existing sights and to provide a better solution.

SUMMARY OF THE INVENTION

A holographic weapon sight with a low profile collimator according to an embodiment of the present invention has a housing with a viewing end and an opposed target end. A viewing path of the holographic weapon sight is defined from the viewing end to the target end. The holographic weapon sight has a light source operable to project a light beam along a light path. The projected light beam has a longitudinal axis, a transverse axis and a vertical axis. The projected light beam may be diverging in a fast axis direction and/or a slow axis direction. The low profile collimator has a first optical element and a second optical element disposed in the light path of the light beam. The first optical element illuminates the second optical element. The first optical element collimates the light beam in the fast axis direction or the slow axis direction and the second optical element collimates the light beam in the slow axis direction or the fast axis direction, respectively, such that the second optical element provides a light beam collimated in the fast axis direction and the slow axis direction.

The holographic weapon sight also has a first diffractive optical element (DOE). The second optical element illuminates the first DOE with the collimated light beam. The collimated light beam from the second optical element has a first width along the transverse axis and a first height along the vertical axis. The first width of the collimated light beam from the second optical element is at least 200% of the first height of the collimated light beam. In some embodiments, the first width of the collimated beam is in a range of about 200% to 500% of the first height of the collimated light beam. In other embodiments, the first width of the collimated beam is up to 1000% of the first height of the collimated light beam. The holographic weapon sight also has a mirror disposed in the path of the collimated light beam. The first DOE reflects the incident collimated light beam towards the mirror such that the reflected collimated light bean has a second width along a transverse axis of the reflected collimated light beam and a second height along a vertical axis of the reflected collimated light beam. The second width of the reflected collimated light beam is in a range of 75% to 125% of the second height.

The holographic weapon sight also has a second DOE disposed in the path of reflected collimated light beam. The second DOE further reflects the collimated light beam. A non-diffractive element (NDE) is disposed in the path of collimated light beam reflected by the second DOE. The first DOE or the second DOE reconstructs an image of a reticle and respectively reflects the reconstructed image toward the mirror or the NDE. In some embodiments, the first DOE and the second DOE are both diffraction gratings and reflect the plane wave collimated light beam toward the mirror and the NDE, respectively. The NDE reflects at least part of the incident light beam toward a user such that the user views a target along the viewing path through the NDE from the viewing end.

In some embodiments, the first DOE and the second DOE are both diffraction gratings and reflect the plane wave collimated light beam toward the mirror and the NDE, respectively.

Some embodiments of the holographic weapon sight further have a magnifying/beam expanding lens disposed in the light path between the light source and the first optical element. It should be noted that magnifying lens and beam expanding lens are herein used interchangeably. The holographic weapon sight may have a first angle defined between an axis of the collimated light beam reflected towards the mirror and an axis of the collimated light beam reflected by the mirror. A second angle is defined between the axis of the collimated light beam reflected by the mirror and an axis of the collimated light beam reflected by the second DOE such that the first angle is substantially equal to the second angle. In some embodiments, the first DOE, the second DOE and/or the NDE selectively reflect wavelengths of the collimated light beam. In other embodiments, the first DOE, the mirror, the second DOE and/or the NDE is movable for windage and/or elevation adjustments.

Another embodiment of a holographic weapon sight has a housing with a viewing end and an opposed target end. The viewing path is defined from the viewing end to the target end. The holographic weapon sight has a light source operable to project a light beam along a light path. The projected light beam has a longitudinal axis, a transverse axis and a vertical axis. The projected light beam is diverging in a fast axis direction and a slow axis direction. The low profile collimator has a first optical element and a second optical element disposed in the light path of the light beam. The first optical element illuminates the second optical element. The first optical element collimates the light beam in the fast axis direction or the slow axis direction and the second optical element collimating the light beam in the slow axis direction or the fast axis direction, respectively, such that the second optical element provides a light beam collimated in the fast axis direction and the slow axis direction.

The holographic weapon sight also has a first diffractive optical element (DOE). The second optical element illuminates the first DOE with the collimated light beam. The collimated light beam from the second optical element has a first width along the transverse axis and a first height along the vertical axis. The first width of the collimated light beam from the second optical element is at least 200% the first height of the collimated light beam. In some embodiments, the first width of the collimated beam is in a range of about 200% to 500% of the first height of the collimated light beam. In other embodiments, the first width of the collimated beam is up to 1000% of the first height of the collimated light beam. A second DOE is disposed in the path of collimated light beam. The first DOE reflects the incident collimated light beam towards the second DOE such that the reflected collimated light beam has a second width along a transverse axis of the reflected collimated light beam and a second height along a vertical axis of the reflected collimated light beam. The second width of the reflected collimated light beam is in a range of 75% to 125% of the second height. The first DOE or the second DOE reconstructs an image of a reticle and respectively reflects the reconstructed image toward the second DOE or a user. In some embodiments, the first DOE and the second DOE are both diffraction gratings and reflect the plane wave collimated light beam toward the second DOE and the user, respectively. The second DOE reflects at least part of the incident collimated light beam toward the user such that the user views a target along the viewing path through the NDE from the viewing end.

Some embodiments of the holographic weapon sight further have a magnifying lens disposed in the light path between the light source and the first optical element. The first DOE and/or the second DOE may selectively reflect wavelengths of the incident collimated light beam. In some embodiments, the first DOE and/or the second DOE is movable for windage and/or elevation adjustments.

BRIEF DESCRIPTION OF THE DRAWINGS

The accompanying drawings, which are included to provide a further understanding of the invention and are incorporated in and constitute a part of this disclosure, illustrate embodiment(s) of the invention and together with the description serve to explain the principle of the invention. In the drawings.

DETAILED DESCRIPTION OF THE INVENTION

As discussed above, the present invention discloses a holographic sight with low profile collimator that uses a collimated light beam to create a reticle that appears to be superimposed on a target when a user views the target through the holographic sight. Embodiments of the present invention have a collimator to collimate a diverging beam generated by a light source, such as a regular LED, a VCSEL, a laser diode or a non-laser light source. The light source discussed in this disclosure may generate light beams of different colors (e.g. red, green, blue, orange etc.). A combination of two optical elements (e.g. two orthogonally positioned cylindrical lenses) may be used to collimate the diverging beam generated by the light source. The collimated light beam illuminates a first diffractive optical element (DOE). Due to the position of the first DOE relative to the collimated light beam, the first DOE forms a collimated plane wave light beam. According to one embodiment, the first DOE illuminates a second DOE with the collimated plane wave light beam. The first or second DOE may reconstruct an image of the reticle. The second DOE reflects the image of the reticle towards the user such that the user views the reconstructed image of the reticle through the second DOE.

According to another embodiment, the first DOE reflects the collimated plane wave light beam towards a mirror. The wavelength of the light beam may change when the temperature of the light source varies. Collimating the light beam using the two optical elements reduces the dispersion effect of the light beam that occurs due to the wavelength change. However, the temperature variation of the light source still introduces some error due to the wavelength shift.

The first DOE illuminates the mirror that reflects the collimated plane wave light beam toward a second DOE. The second DOE reflects the incident collimated plane wave light beam toward a non-diffractive element (NDE). The achromatic arrangement of the first DOE, second DOE and the mirror compensates for any wavelength shift. The NDE is positioned to reflect the collimated plane wave light beam from the second DOE at an angle away from the first and second DOEs, and toward the user's eye. The first or second DOE may reconstruct an image of the reticle. This configuration allows the user to view the reconstructed image of the reticle without looking directly through the first or second DOEs. Because DOEs are generally less clear optically than the NDEs, the user gets a better view of the target when viewing it through the NDE.

A holographic optical element (HOE)/diffractive optical element (DOE) is disposed in the path of the light beam, which reconstructs an image of a reticle. As used herein, a diffractive optical element (DOE) is an optical element that primarily relies on the principle of diffraction i.e. if a DOE is illuminated with a light beam, a DOE shapes or modifies the incident light beam by diffraction. Non-limiting examples of the DOE include Kinoform optical elements or Binary optical elements that are made by structures that have an approximate shape of a desired/ideal surface; Holographic Optical Elements (HOE)—discussed below; Hybrid lenses that have a combined refractive and diffractive power (e.g. Canon lens); Computer Generated Holograms (CGHs), wherein a hologram may be printed by a laser using a computer; Gratings that may be made by an etching process (e.g. Ruled or Machined gratings); and Grating Prisms (GRISMs) that are a combination of a prism and grating arranged so that the incident light at a chosen central wavelength passes straight through. Since a mirror does not diffract the incident light beam, a mirror is not a diffractive optical element.

A holographic optical element (HOE) is a type of DOE and is defined as an optical element (such as a diffractive lens, filter, beam splitter, or diffraction grating) that is produced using holographic imaging processes or principles. The HOE may be made by interfering light beams and recording the interference pattern on a suitable media. Generally, two beams from a light source, e.g. laser beam, are interfering in recording materials. One beam is an object beam reflected or scattered from an object to be recorded, and another beam is a reference beam. The object beam and the reference beam intersect and interfere with each other to record an interference pattern in the recording materials. This interference pattern records the information of the object on a HOE. In sighting devices used for weapons or optical devices, the HOE may be used to reconstruct the recorded image of a reticle such that a user may view the reticle superimposed on a target. In some embodiments, the user of the weapon or optical device may view the target through the HOE, which requires that the HOE be of certain dimension to enable the user's eye to view the target through the HOE. The HOEs thus manufactured are generally clear enough to allow a user to view an object through the HOE, e.g. to view a target through the HOE.

The definition of a HOE also includes a binary optical element e.g. computer generated holograms. Computer-generated holography (CGH) is a method of digitally generating holographic interference patterns. A holographic image may be generated with a computer simulation without generating an actual interference. A holographic interference pattern is digitally computed and printed onto a medium e.g. a mask or film, for subsequent illumination by a suitable light source. The DOE may be manufactured by the CGH method if the fringe pattern is created one pixel at a time. According to one method, the fringe pattern may be digitally transferred to shims that may be used to stamp all the HOEs. According to another method for making a HOE, a photo resist technique is used to manufacture a developed plate that is used to make the shims. These HOEs may be stamped either as a reflection type HOE or a transmission type HOE. Unlike the above-discussed HOEs made by the interfering light beams, the stamped HOEs are typically not clear enough to allow the user to view an object through the stamped HOE. CGH allows manufacturing HOEs without a need to record each holographic optical element individually. If an element that diffracts light is made by light interference in a medium it is generally called a HOE. The method of digitally generating holographic interference patterns is also called computer generated holography (CGH) because it started from the simulation of holograms by computer. The term DOE and HOE may generally be used interchangeably. Embodiments according to the present invention may use a DOE or HOE interchangeably.

The present invention proposes an arrangement wherein the user views the reconstructed image generated by the DOE through the DOE or another optical element i.e. a non-diffractive optical element (NDE), which may consist of a partial mirror, glass or an element with a dichroic film coating. As used herein, a NDE is defined as an optical element for redirecting a pattern of a light beam while preserving wavefront and fringe characteristics. As such, a NDE is not a DOE or HOE. When the HOE or DOE reconstructs the image of a reticle, this image may be reflected in or by a NDE in certain embodiments. Thus, the NDE may serve two functions for such a sight. The NDE reflects the image such that it may be viewed by the user's eye. Additionally, the user may view a target through the same NDE such that the reticle is superimposed on the target. This facilitates the user for aiming the weapon or optical device. Therefore, the user views the reticle and the target through the NDE.

Certain NDEs primarily rely on the principle of refraction. The index of refraction "n" is a function of wavelength of an incident light beam. Non-limiting examples of a refractive NDE include Conventional lenses; Compound lenses; Gradient-index (GRIN) lenses that are produced by a gradual variation of the refractive index of a material; Prisms that are used to disperse light beams; Optical fibers that are flexible and transparent fibers made by drawing glass or plastic; Optical Waveguides e.g. total internal reflection mirrors; Axicon, Spherical, or Cylindrical lenses e.g. one dimensional or other shaped lenses; and Fresnel lens. Most NDEs e.g. compound lenses, except prisms, are made to compensate for any wavelength change in the incident light beam and are said to be achromats.

Reference will now be made in detail to the preferred embodiments of the present disclosure, examples of which are illustrated in the accompanying drawings. Wherever possible, the same reference numbers will be used throughout the drawings to refer to the same or like parts. In addition, although the terms used in the present disclosure are selected from generally known and used terms, some of the terms mentioned in the description of the present disclosure have been selected by the applicant at his or her discretion, the detailed meanings of which are described in relevant parts of the description herein.

Figure 1:
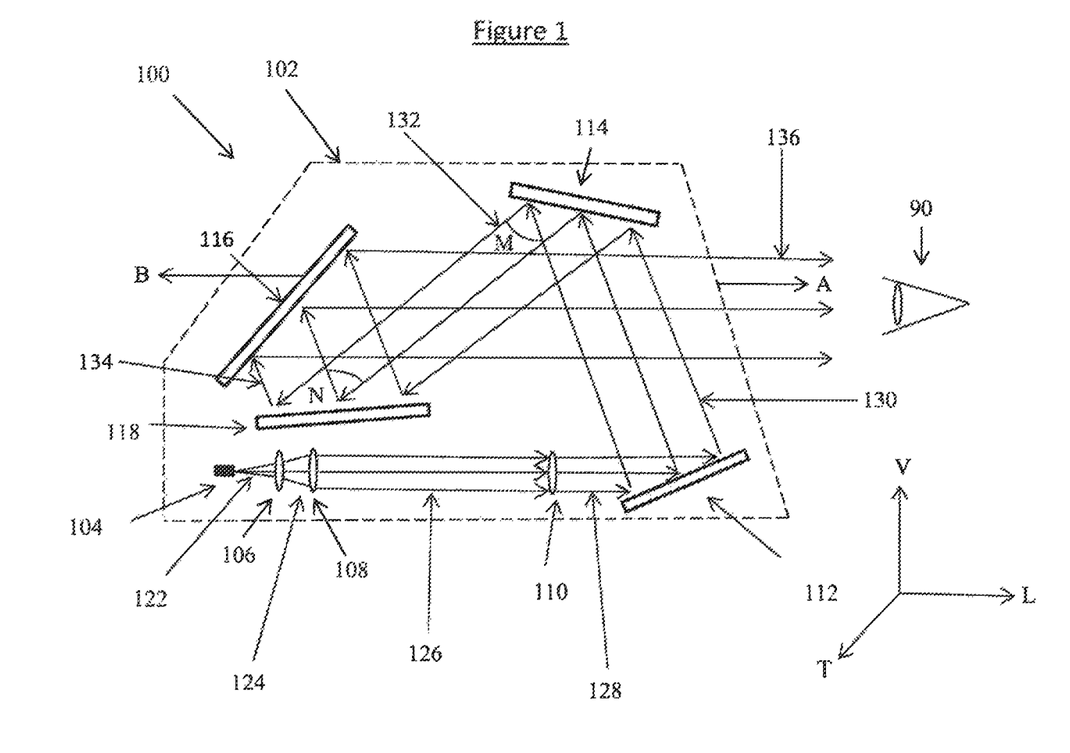
FIG. 1 is a schematic of an embodiment of a holographic weapon sight with a low profile collimator.

FIG. 1 is a schematic view of a holographic gunsight 100 with a low profile collimator that allows a user 90 to view a target (not shown) along a viewing path AB. The viewing path AB has a viewing end A near the user's eye and an opposing target end B towards the target of the holographic weapon sight 100. As shown, the holographic weapon sight 100 is enclosed in a housing 102 and the housing 102 is attached to a weapon (not shown). Other embodiments of the holographic weapon sight according to the present invention may also be enclosed in their respective housings and these housings are attached to their respective weapons. Any embodiment of the holographic weapon sight according to the present invention may have a clamp (not shown) for attaching the housing to a weapon.

The arrangement of FIG. 1 results in a system that provides a generally collimated holographic image with achromatic properties. These achromatic properties mean that changes in a wavelength of a light source do not significantly influence the position of the reticle as viewed by the user. The holographic weapon sight 100 has a light source 104. The light source 104 may be non-laser based e.g. a regular LED or laser based light source (i.e. laser diode/VCSEL). In some embodiments, the light source 104 may change color and/or intensity of the generated light beam. The light source 104 projects a diverging beam 122 along a light path, and a magnifying lens 106, a first optical element 108, a second optical element 110 and a first DOE 112 is respectively disposed in the light path. The diverging beam 122 has a longitudinal axis L1, a transverse axis T1 and a vertical axis V1. The diverging beam 122 is diverging in a fast axis direction and a slow axis direction. The fast axis direction and the slow axis direction may respectively be parallel either to the vertical axis V1 and the transverse axis T1 or to the transverse axis T1 and the vertical axis V1.

The light source 104 projects the diverging beam 122 onto the magnifying lens 106 that magnifies the diverging beam and illuminates the first optical element 108 with a magnified diverging beam 124. In some embodiments, the light source 104 may project the diverging beam 122 directly onto the first optical element 108. The first optical element 108 partially collimates the magnified diverging beam 124 and illuminates the second optical element 110 disposed in the light path of a partially collimated light beam 126. The second optical element 110 further collimates the partially collimated light beam 126 and illuminates the first DOE 112 with a generally fully collimated light beam 128.

Figure 2:
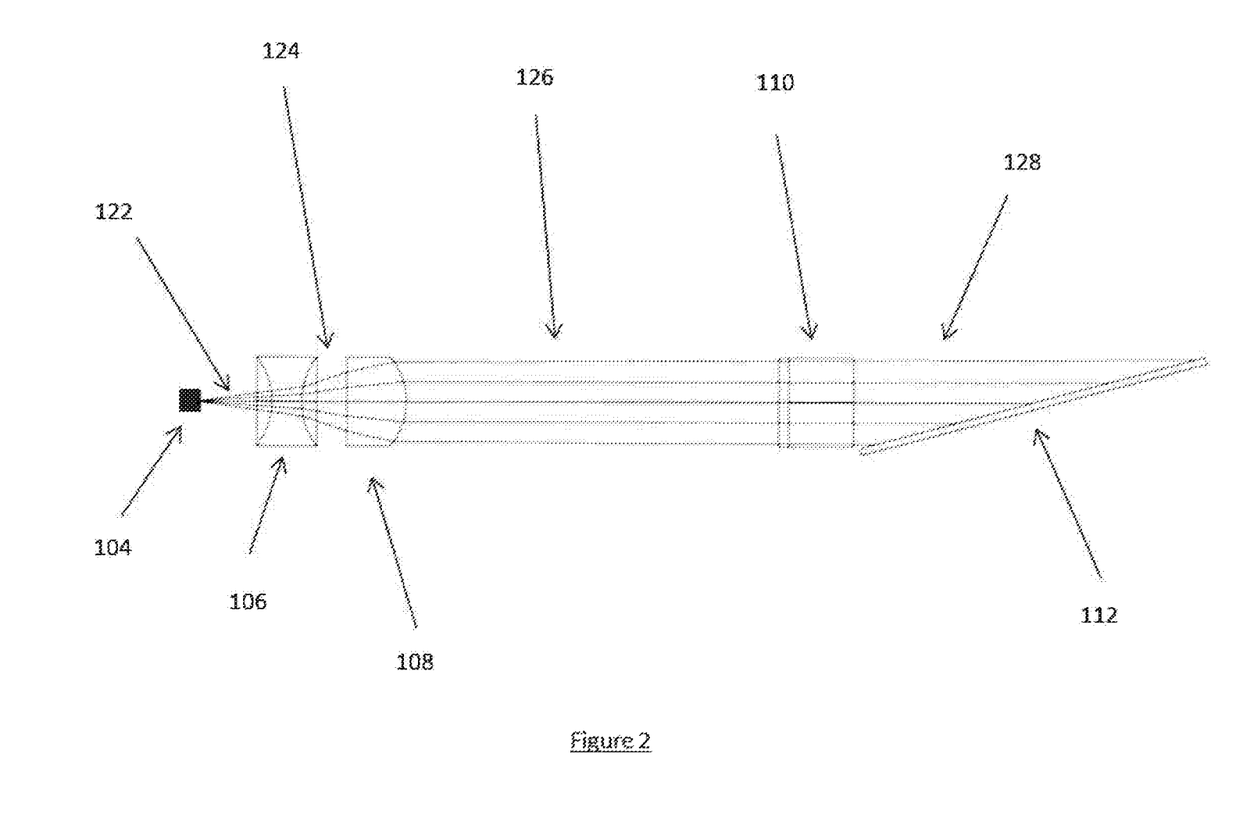
FIG. 2 is a side view of part of the holographic weapon sight shown in FIG. 1.
Figure 3:
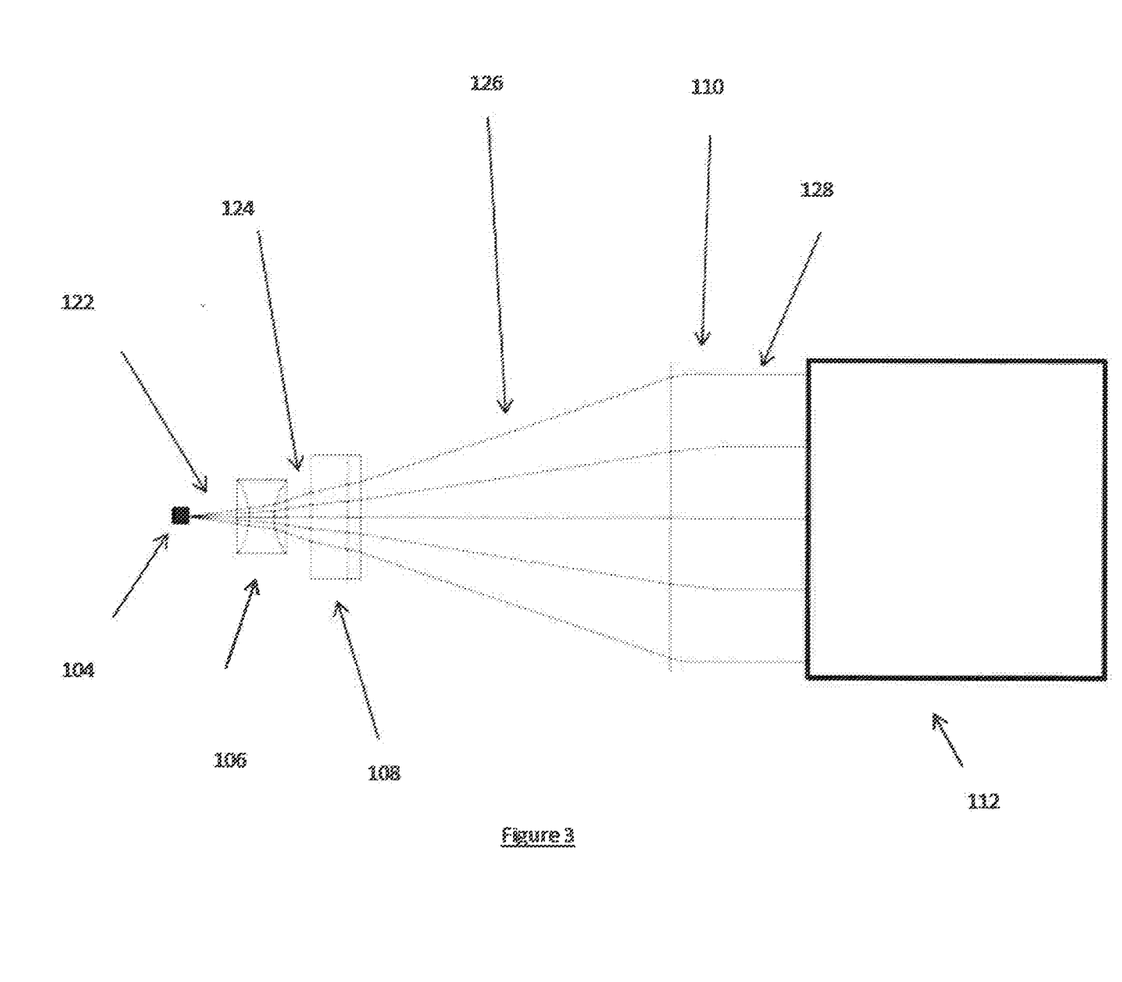
FIG. 3 is a top view of the part shown in FIG. 2.

FIG. 2 shows a side view of the low profile collimator that forms part of the holographic weapon sight and FIG. 3 shows a top view of the collimator shown in FIG. 2. In FIG. 2, the first optical element 108 is collimating the magnified diverging beam 124 along the vertical axis V1. FIG. 3 shows the second optical element 110 collimating the partially collimated light beam 126 along the transverse axis T1. If the first optical element 108 is collimating the magnified diverging beam 124 in the fast axis direction or the slow axis direction, then the second optical element 110 collimates the partially collimated light beam 126 in the slow axis direction or the fast axis direction, respectively.

Figure 4:
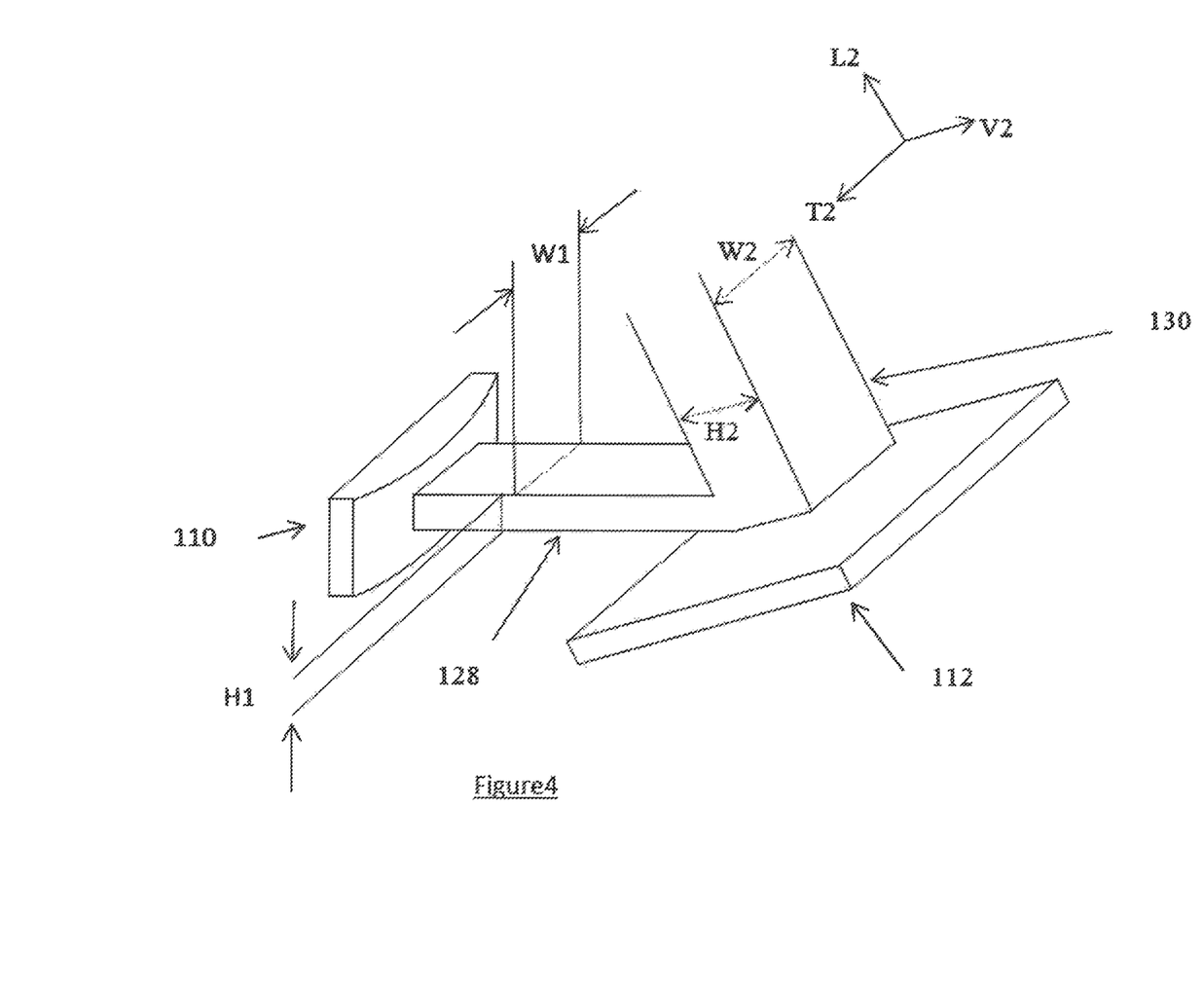
FIG. 4 is a perspective view of part of the holographic weapon sight shown in FIG. 1.

FIG. 4 is a perspective view of part of the holographic weapon sight 100. The fully collimated light beam 128 has a first width W1 along the transverse axis T1 and a first height H1 along the vertical axis V1. The first width W1 is about twice the first height H1. In some embodiments, the first width W1 may be in a range of about two to five times the first height H1. In other embodiments, the first width W1 is up to 10 times the first height H1. The first DOE 112 reflects the fully collimated light beam 128 toward a mirror 114 in FIG. 1. The plane wave collimated light beam 130 has a longitudinal axis L2, a transverse axis T2 and a vertical axis V2. The plane wave collimated light beam 130 has a second width W2 along the transverse axis T2 and a second height H2 along the vertical axis V2. The second width W2 is in a range of 75% to 125% of the second height H2.

Referring again to FIG. 1, the mirror 114 reflects the plane wave collimated light beam 130 and illuminates a second DOE 118 with the reflected light beam 132. The holographic weapon sight 100 has an angle M between the plane wave collimated light beam 130 and the reflected light beam 132. Either the first DOE 112 or the second DOE 118 may reconstruct an image of a reticle. In some embodiments, the first DOE 112 reconstructs the image of the reticle and the reconstructed image of the reticle is projected upon the mirror 114 in the form of plane wave collimated light beam 130. In other embodiments, the second DOE 118 reconstructs an image of the reticle and illuminates a NDE 116. The second DOE 118 illuminates the NDE 116 with a reconstructed image 134. The NDE 116 projects the image of the reticle 136 towards the user 90. The user 90 views the image of the reticle 136 through the NDE 116 and the reticle appears to be overlaid on the target (not shown).

According to another embodiment of FIG. 1, the first DOE 112 and the second DOE 118 are both diffraction gratings. Unlike the above discussed embodiment, neither the first DOE 112 nor the second DOE 118 reconstruct an image of a reticle. The first DOE 112 directs the plane wave collimated light beam 130 towards the mirror 114 that reflects the plane wave collimated light beam 132 towards the second DOE 118. The second DOE 118 illuminates the NDE 116 with the plane wave collimated light beam 134. The NDE 116 projects the plane wave collimated light beam 136 towards the user 90. The user's eye focuses on the plane wave collimated light beam and perceives it as a circular dot which may be less than 1 minute of angle (MOA). The user 90 views the plane wave collimated light beam 136 through the NDE 116 and the circular dot appears to be overlaid on the target (not shown). For example, if the light source 104 projects a red diverging beam 122, the user 90 would view a red circular dot overlaid on the target (not shown). The color of the circular dot depends on the color of the light beam projected by the light source. Such an embodiment may be referred to as a red dot sight, independent of the actual color.

In the embodiments discussed above, the holographic weapon sight 100 has an angle N between the reflected light beam 132 and the reconstructed image 134/the plane wave collimated light beam 134. A change in temperature of the light source 104 may change the diverging beam's 122 wavelength. Generally, a wavelength change deteriorates the quality of the image of the reticle generated by a holographic gunsight. In the holographic weapon sight 100, the angles M and N are about equal. For example, in some embodiments the first DOE 112, the mirror 114 and the second DOE 118 are positioned such that both M and N are about 45°. In other embodiments, the first DOE 112, mirror 114 and the second DOE 118 are positioned such that both M and N may be chosen from a range of angles, such that angles M and N form an achromatic pair. The wavelength change causes a shift in the angle M in a direction. The mirror 114 and the second DOE 118 are positioned such that the second DOE 118 shifts the reconstructed image 134 in an equal and opposite direction to compensate for the wavelength change. According to FIG. 1, the angles M and N remain about the same even if the wavelength of the light source 104 changes due to the temperature change or any other reason. In other embodiments, angles M and N are determined such that the holographic weapon sight is configured as a generally achromatic system/configuration and the reconstructed image/plane wave collimated light beam 134 is compensated for any deviation in the wavelength of the light source 104. The first DOE 112, the mirror 114 and the second DOE 118 are thus configured as a generally achromatic system/configuration.

Figure 5:
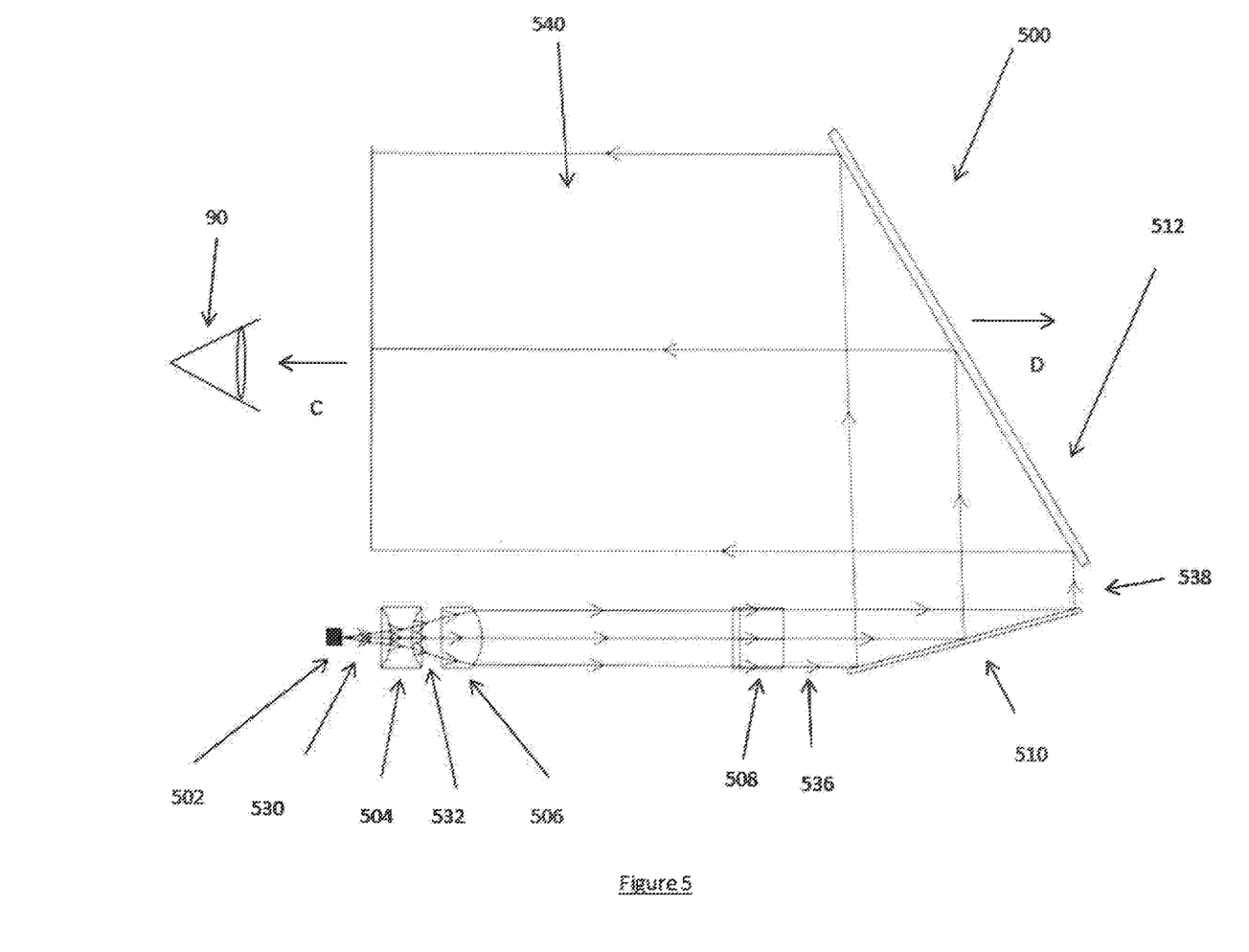
FIG. 5 is a schematic of another embodiment of a holographic weapon sight.

FIG. 5 shows another embodiment of a holographic weapon sight 500 that provides a generally collimated holographic image. The holographic weapon sight 500 allows a user 90 to view a target (not shown) along a viewing path CD. The viewing path CD has a viewing end C near the user's eye and an opposing target end D towards the target of the holographic weapon sight 500.

The holographic weapon sight 500 has a light source 502. The light source 502 may be non-laser based e.g. a regular LED or laser based light source (laser diode/VCSEL). In some embodiments, the light source 502 may change color and/or intensity of the generated light beam. The light source 502 projects a diverging beam 530 along a light path, and a magnifying lens 504, a first optical element 506, a second optical element 508 and a first DOE 510 is respectively disposed in the light path. The light source 502 projects the diverging beam 530 onto the magnifying lens 504 that magnifies the diverging beam and illuminates the first optical element 506 with a magnified diverging beam 532. In some embodiments, the light source 502 may project the diverging beam directly onto the first optical element 506. Similar to the holographic weapon sight 100, the second optical element 508 also generates a fully collimated light beam 536 and illuminates the first DOE 510. The first DOE 510 reflects the fully collimated plane wave light beam 538 toward a second DOE 512. Generation of the plane wave light beam is discussed above in reference to the holographic weapon sight 100. Either the first DOE 510 or the second DOE 512 may reconstruct an image of a reticle. In some embodiments, the first DOE 510 reconstructs the image of the reticle, and the reconstructed image of the reticle is projected upon the second DOE 512. In other embodiments, the second DOE 512 reconstructs an image of the reticle and the second DOE 512 projects the image of the reticle 540 towards the user 90. The user 90 views the image of the reticle 540 through the second DOE 512 and the reticle appears to be overlaid on the target (not shown).

According to another embodiment of FIG. 5, the first DOE 510 and the second DOE 512 are both diffraction gratings. Unlike the above discussed embodiment, neither the first DOE 510 nor the second DOE 512 reconstruct an image of a reticle. The first DOE 510 directs the plane wave collimated light beam 538 towards the second DOE 512 that projects the plane wave collimated light beam 540 towards the user 90. The user's eye focuses on the plane wave collimated light beam and perceives it as a circular dot which may be less than 1 minute of angle (MOA). The user 90 views the plane wave collimated light beam 540 through the second DOE 512 and the circular dot appears to be overlaid on the target (not shown). For example, if the light source 502 projects a red diverging beam 530, the user 90 would view a red circular dot overlaid on the target (not shown). The color of the circular dot depends on the color of the light beam projected by the light source. Such an embodiment may be referred to as a red dot sight, independent of the actual color.

In the embodiments discussed above, the first DOE 112, the second DOE 118, the NDE 116, the first DOE 510 and/or the second DOE 512 may reflect a percentage of the incident light or may act as a bandpass reflector that is more transparent to wavelengths other than those of the reticle. In some embodiments, the first DOE 112, the second DOE 118, the mirror 114, the NDE 116, the first DOE 510 and/or the second DOE 512 may be movable to make adjustments for windage and/or elevation errors. In one non-limiting example, the NDE 116 has a 650-700 nm reflection filter, which allows 400-650 nm to pass through it. Similarly, the NDE 116 may also be more reflective to certain wavelengths, such as wavelengths approximately the same as the wavelengths produced by the light source and/or in the reconstructed image of the reticle. Such a bandpass reflector may be more transparent to wavelengths other than those of the reticle and therefore the target image remains highly visible. Holographic Optical Element (HOE) or Diffractive Optical Element (DOE) may be used interchangeably such that the embodiments according to this disclosure may either use a HOE or DOE depending on the specific application. A person skilled in the art should be able to make this determination.

It will be apparent to those skilled in the art that various modifications and variations can be made in the present disclosure without departing from the spirit or scope of the inventions. Thus, it is intended that the present disclosure cover the modifications and variations of this disclosure. The present disclosure has been described with reference to some embodiments. However, it is realized that variants and equivalents to the preferred embodiments may be provided without departing from the scope of the disclosure as defined in the accompanying claims. It is to be understood that the detailed description of the present disclosure are exemplary and explanatory and are intended to provide further explanation of the disclosure. It is not intended to be exhaustive or to limit embodiments to the precise form disclosed. Accordingly, all modifications are intended to be included within the scope of the embodiments of the present disclosure as defined in the following claims.

The invention claimed is:

1. A holographic weapon sight, comprising: a housing having a viewing end and an opposed target end, a viewing path being defined from the viewing end to the target end; a light source operable to project a light beam along a light path, the projected light beam having a longitudinal axis, a transverse axis and a vertical axis, the projected light beam diverging in a fast axis direction and a slow axis direction; a first optical element and a second optical element disposed in the light path of the light beam, the first optical element illuminating the second optical element, the first optical element collimating the light beam in the fast axis direction or the slow axis direction and the second optical element collimating the light beam in the slow axis direction or the Past axis direction, respectively, such that the second optical element provides a light beam collimated in the fast axis direction and the slow axis direction; a first diffractive optical element (DOE), the second optical element illuminating the first DOE with the collimated light beam, the collimated light beam from the second optical element having a first width along the transverse axis and a first height along the vertical axis, the first width of the collimated light beam from the second optical element being at least 200% the first height of the collimated light beam; a mirror disposed in the path of the collimated light beam, the first DOE reflecting the incident collimated light beam towards the mirror such that the reflected collimated light beam has a second width along a transverse axis of the reflected collimated light beam and a second height along a vertical axis of the reflected collimated light beam, the second width of the reflected collimated light beam being in a range of 75% to 125% of the second height; a second DOE disposed in the path of the reflected collimated light beam, the second DOE further reflecting the collimated light beam; a non-diffractive element (NDE) disposed in the path of the collimated light beam reflected by the second DOE, the NDE reflecting at least part of the incident light beam toward a user such that the user views a target along the viewing path through the NDE from the viewing end.

2. The holographic weapon sight of claim 1, further comprising a magnifying lens disposed in the light path between the light source and the first optical element.

3. The holographic weapon sight of claim 1, wherein at least one of the first DOE or the second DOE reconstructing an image of a reticle and respectively reflecting the reconstructed image toward the mirror or the NDE.

4. The holographic weapon sight of claim 1, wherein neither the first DOE nor the second DOE reconstruct an image of a reticle, the first DOE and the second DOE reflecting the incident collimated light beam as a red dot toward the mirror and the NDE, respectively.

5. The holographic weapon sight of claim 1, further having a first angle defined between an axis of the collimated light beam reflected towards the mirror and an axis of the collimated light beam reflected by the mirror, and a second angle defined between the axis of the collimated light beam reflected by the mirror and an axis of the collimated light beam reflected by the second DOE, the first angle being substantially equal to the second angle.

6. The holographic weapon sight of claim 1, wherein the first DOE, the second DOE, the NDE or combination thereof selectively reflect wavelengths of the collimated light beam.

7. The holographic weapon sight of claim 1, wherein the first DOE, the mirror, the second DOE, the NDE, or combination thereof is movable for windage, elevation, or both the windage and elevation adjustments.

8. A holographic weapon sight, comprising: a housing having a viewing end and an opposed target end, a viewing path being defined from the viewing end to the target end; a light source operable to project a light beam along a light path, the projected light beam having a longitudinal axis, a transverse axis and a vertical axis, the projected light beam diverging in a fast axis direction and a slow axis direction; a first optical element and a second optical element disposed in the light path of the light beam, the first optical element illuminating the second optical element, the first optical element collimating the light beam in the fast axis direction or the slow axis direction and the second optical element collimating the light beam in the slow axis direction or the fast axis direction, respectively, such that the second optical element provides a light beam collimated in the fast axis direction and the slow axis direction; a first diffractive optical element (DO), the second optical element illuminating the first DOE with the collimated light beam, the collimated light beam from the second optical element having a first width along the transverse axis and a first height along the vertical axis, the first width of the collimated light beam from the second optical element being at least 200% the first height of the collimated light beam; a second DOE disposed in the path of the collimated light beam, the first DOE reflecting the incident collimated light beam towards the second DOE such that the reflected collimated light beam has a second width along a transverse axis of the reflected collimated light beam and a second height along a vertical axis of the reflected collimated light beam, the second width of the reflected collimated light beam being in a range of 75% to 125% of the second height, the second DOE reflecting at least part of the incident collimated light beam toward the user such that the user views a target along the viewing path through the second DOE from the viewing end.

9. The holographic weapon sight of claim 8, further comprising a magnifying lens disposed in the light path between the light source and the first optical element.

10. The holographic weapon sight of claim 8, wherein one of the first DOE or the second DOE reconstructing an image of a reticle and respectively reflecting the reconstructed image toward the second DOE or a user.

11. The holographic weapon sight of claim 8, wherein the first DOE, the second DOE, or both the first DOE and the second DOE selectively reflect wavelengths of the incident collimated light beam.

12. The holographic weapon sight of claim 8, wherein the first DOE, the second DOE, or both the first DOE and the second DOE is movable for windage, elevation or both the windage and elevation adjustments.

13. The holographic weapon sight of claim 8, wherein neither the first DOE nor the second DOE reconstruct an image of a reticle, the first DOE and the second DOE reflecting the incident collimated light beam as a red dot toward the second DOE and the user, respectively.

\* \* \* \* \*